US007778986B2

(12) United States Patent
Bish et al.

(10) Patent No.: US 7,778,986 B2
(45) Date of Patent: Aug. 17, 2010

(54) SECURING TRANSFER OF OWNERSHIP OF A STORAGE OBJECT FROM AN UNAVAILABLE OWNER NODE TO ANOTHER NODE

(75) Inventors: Thomas William Bish, Tucson, AZ (US); Thirumale Niranjan, Bangalore (IN); Mark Albert Reid, Tucson, AZ (US); Joseph M. Swingler, Tucson, AZ (US); Michael Wayne Young, Pittsburgh, PA (US)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 11/847,261

(22) Filed: Aug. 29, 2007

(65) Prior Publication Data
US 2009/0063487 A1    Mar. 5, 2009

(51) Int. Cl.
G06F 13/30    (2006.01)
(52) U.S. Cl. .................. 707/704; 707/687; 714/4; 714/13
(58) Field of Classification Search ......... 707/687–704; 709/201–219; 714/1–57
See application file for complete search history.

(56) References Cited
U.S. PATENT DOCUMENTS

| 5,826,265 | A | 10/1998 | Van Huben et al. |
| 5,909,553 | A | 6/1999 | Campbell et al. |
| 6,094,654 | A * | 7/2000 | Van Huben et al. ........ 1/1 |
| 6,272,491 | B1 * | 8/2001 | Chan et al. .......... 707/8 |
| 6,321,238 | B1 * | 11/2001 | Putzolu ............. 1/1 |
| 6,574,654 | B1 | 6/2003 | Simmons et al. |
| 6,618,744 | B1 | 9/2003 | Simmons et al. |
| 6,668,295 | B1 | 12/2003 | Chan |

(Continued)

FOREIGN PATENT DOCUMENTS
WO    98/03912    1/1998

(Continued)

OTHER PUBLICATIONS

U.S. Patent Application entitled "Propagation of Updates for Attributes of a Storage Object from an Owner Node of the Storage Object to Other Nodes", Serial No. unknown, filing date Aug. 31, 2007, IBM, by inventors T.W. Bish, M.A. Reid, J.M. Swingler and M.W. Young.

(Continued)

Primary Examiner—Tim T. Vo
Assistant Examiner—Michelle Owyang
(74) Attorney, Agent, or Firm—Rabindranath Dutta; Konrad Raynes & Victor LLP

(57) ABSTRACT

Provided are a method, system, and article of manufacture that maintain a plurality of nodes coupled over a network, wherein a first node of the plurality of nodes initially owns a plurality of storage objects accessible via the network. A serialization lock is maintained in association with the plurality of storage objects, wherein the first node becomes unavailable. A second node of the plurality of nodes determines that the second node is to preemptively assume ownership of a selected storage object of the plurality of storage objects initially owned by the first node that has become unavailable. The second node acquires the serialization lock. The second node secures ownership of the selected storage object, subsequent to acquiring the serialization lock.

20 Claims, 7 Drawing Sheets

U.S. PATENT DOCUMENTS

| | | | |
|---|---|---|---|
| 6,708,198 | B1 | 3/2004 | Simmons et al. |
| 6,775,673 | B2 | 8/2004 | Mahalingam et al. |
| 7,010,528 | B2 * | 3/2006 | Curran et al. ................... 707/8 |
| 7,020,669 | B2 * | 3/2006 | McCann et al. .................... 1/1 |
| 7,085,897 | B2 | 8/2006 | Blake et al. |
| 7,149,853 | B2 * | 12/2006 | Krueger ...................... 711/150 |
| 7,200,623 | B2 * | 4/2007 | Chandrasekaran et al. ......... 1/1 |
| 7,324,995 | B2 * | 1/2008 | Findleton et al. ............... 707/8 |
| 7,409,525 | B1 * | 8/2008 | Clark et al. ................. 711/206 |
| 7,640,242 | B2 * | 12/2009 | Chatterjee et al. .................. 1/1 |
| 2003/0065782 | A1 | 4/2003 | Nishanov et al. |
| 2006/0036896 | A1 * | 2/2006 | Gamache et al. ............... 714/4 |
| 2006/0184528 | A1 * | 8/2006 | Rodeh ........................... 707/8 |
| 2008/0177741 | A1 * | 7/2008 | Joshi et al. ..................... 707/8 |

FOREIGN PATENT DOCUMENTS

WO    2005/045644    5/2005

OTHER PUBLICATIONS

U.S. Patent Application entitled "Transfer of Ownership of a Storage Object in Response to an Original Owner Node Becoming Available After a Period of Unavailability", Serial No. unknown, filing date Aug. 31, 2007, IBM, by inventors T.W. Bish, J.W. Peake, M.A. Reid, and J.M. Swingler.

O. Schoenborn, "Strict Ownership, STL Containers, & the NoPtr Library", C/C++ Users Journal, vol. 22, No. 5, May 2004, pp. 40-43.

* cited by examiner

SECURING TRANSFER OF OWNERSHIP OF A STORAGE OBJECT FROM AN UNAVAILABLE OWNER NODE TO ANOTHER NODE

BACKGROUND

1. Field

The disclosure relates to a method, system, and article of manufacture for securing the transfer of ownership of a storage object from an unavailable node to another node.

2. Background

In a distributed storage system, a plurality of distributed nodes, such as distributed computational devices, may have access to a plurality of logical storage volumes, wherein the logical storage volumes are logical representations of physical storage volumes that may store data and metadata. The plurality of logical storage volumes may be distributed across the plurality of distributed nodes and may be shared among some or all of the plurality of distributed nodes. Some or all of the nodes of the plurality of distributed nodes may be able to access, read, write, and perform other operations on the shared logical storage volumes.

The logical storage volumes may also be referred to as storage objects, wherein the storage objects may be shared among some or all of the plurality of distributed nodes of the distributed storage system. Storage objects may also comprise other units of data representations besides logical storage volumes.

SUMMARY OF THE PREFERRED EMBODIMENTS

Provided are a method, system, and article of manufacture that maintain a plurality of nodes coupled over a network, wherein a first node of the plurality of nodes initially owns a plurality of storage objects accessible via the network. A serialization lock is maintained in association with the plurality of storage objects, wherein the first node becomes unavailable. A second node of the plurality of nodes determines that the second node is to preemptively assume ownership of a selected storage object of the plurality of storage objects initially owned by the first node that has become unavailable. The second node acquires the serialization lock. The second node secures ownership of the selected storage object, subsequent to acquiring the serialization lock.

In certain embodiments, the second node stores state information corresponding to the selected storage object. The second node communicates ownership validity information of the selected storage object to other nodes of the plurality of nodes. The second node releases the serialization lock. Other nodes are allowed to acquire ownership of the selected storage object.

In additional embodiments, the state information comprises: (i) ownership validity information indicating which node was a valid owner of the selected storage object at a time of taking over ownership of the selected storage object by the second node; (ii) data version stored in the selected storage object at the time of taking over ownership of the selected storage object by the second node; (iii) metadata about the data stored in the selected storage object at the time of taking over ownership of the selected storage object by the second node.

In still further embodiments, it is determined that the second node is to become unavailable, wherein the first node is still unavailable. The second node transfers state information of the selected storage object, to a third node of the plurality of nodes, wherein the third node assumes responsibility for maintaining the state information corresponding to the selected storage object prevailing at a time the selected node was preemptively transferred from the first node that initially owned the selected storage object, and wherein the third node communicates ownership validity information of the selected storage object to other nodes of the plurality of nodes.

In yet additional embodiments an updating is performed of the preemptive ownership transfer of the selected storage object on the first node, either from the second node or from some other node that has acquired state information of the selected storage object directly or indirectly from the second node, in response to the first node becoming available.

BRIEF DESCRIPTION OF THE DRAWINGS

Referring now to the drawings in which like reference numbers represent corresponding parts throughout.

DETAILED DESCRIPTION

Figure 1:
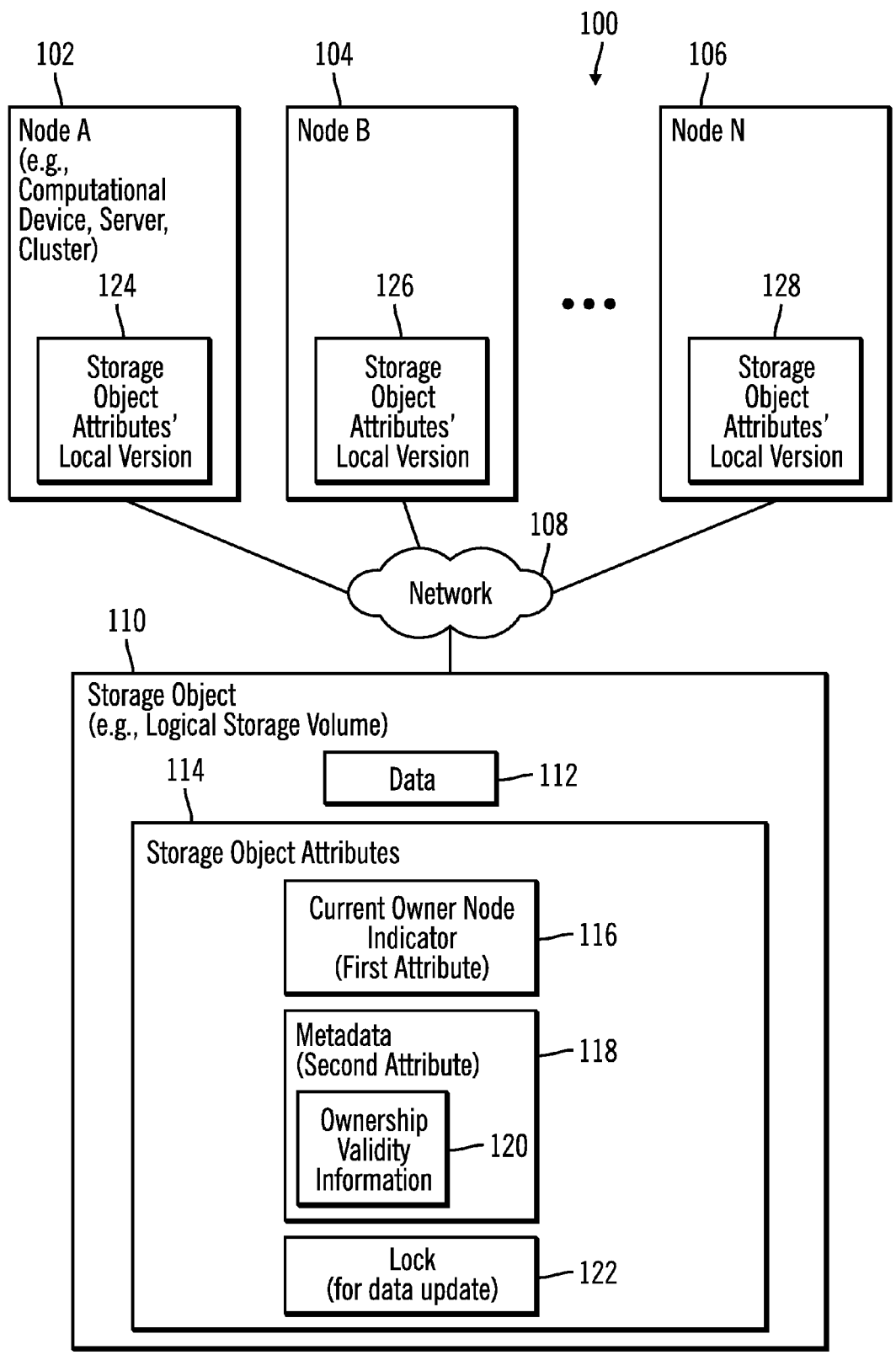
FIG. 1 illustrates a block diagram of a computing environment that includes a plurality of nodes, in accordance with certain embodiments.

In the following description, reference is made to the accompanying drawings which form a part hereof and which illustrate several embodiments. It is understood that other embodiments may be utilized and structural and operational changes may be made.

Ownership Protocol in a Composite Storage Server

In a composite storage server in which a plurality distributed sites have equal access to a plurality of logical storage volumes, mechanisms may be provided to atomically manage the usage of the shared logical storage volumes. The equal access to a logical storage volume may be initiated by a site's internal mechanisms or by requests issued directly to a distributed site. One distributed site may be guaranteed exclusive access to one particular storage volume within the composite storage server. In addition, each distributed site within the composite library may have the ability to depend on this exclusive distributed site for the most consistent view of the composite storage server with respect to the storage volume exclusively accessed by the exclusive distributed site. Furthermore, this exclusive right to the storage volume may cause the privileged distributed site to execute commands on behalf of the peers of the privileged distributed site when non-exclusive commands co-exist with protected commands.

In certain situations only one distributed site within the composite storage server can have exclusive ownership of a storage volume at any given time. The ownership carries with it responsibilities and privileges with regards to the owned storage volume. The ownership can be explicitly surrendered or passed on to a distributed peer node using an ownership exchange process. The current owner node of a storage volume may have ultimate authority on: (a) any consistency associated with the storage volume; (b) associated properties of the storage volume; and, (c) any external entities directly mapped to the storage volume. The owner node also has the ability to invalidate or synchronize the owned storage volume at peer distributed sites when needed. Furthermore, an ownership protocol may use an appropriate update mechanism to ensure there are no race conditions during ownership exchanges.

Each distributed site may have a token or object which is used to store both local and composite properties associated with a particular storage volume. This token includes information on the current owner within the composite storage server. In addition, the ownership may be tracked with an additional ownership version property also referred to as an ownership validity indicator. The version property may be increased with each ownership exchange and synchronized among all distributed sites within the composite storage server. The current owner is responsible for updating the current owner and the ownership version value within each distributed site's token. When ownership is in question, the site with the largest value of the ownership version determines which distributed site is the current owner.

The ownership protocol may also allow the marking of a storage volume as busy. Ownership alone does not provide exclusive access to a storage volume's contents and/or properties without first reserving the storage volume, particularly in situations in which multiple processes have equal access to the same storage volume within a single distributed site. Therefore, once ownership is obtained or verified, the token is moved to a reserved state. Once the operation has completed, the token can be unlocked. Ownership will remain at the distributed site until a neighboring distributed peer explicitly requests ownership transfer. If an ownership request occurs during the busy state, the ownership request will be denied with a busy or in-use response.

In addition, a storage volume may have associated processes or functions that can be run against the storage volume, wherein the processes or functions can be executed in parallel to the exclusively protected commands. Since ownership cannot be transferred during execution of exclusively protected commands, the processes or functions are forwarded to the current owner node of the storage volume. The current owner node of the storage volume may then execute the command on behalf of one of the peers of the current owner node. Any updates which may result are controlled by the owner node and only when the exclusive access and all parallel forwarded operation have completed will the storage volume ownership be in a state in which ownership transfer is permitted.

Ownership Takeover

The ownership protocol described above may work well when the owner node is always available. The protocol may break down when the owner node becomes unavailable. Certain embodiments provide implementations for ownership takeover when the owner node is unavailable. This may be first performed by providing permission to take over ownership via any of the following mechanisms:

1. First mechanism: Ownership takeover can be performed via explicit user request. For example, a person may walk up to a configuration panel and explicitly provide the remaining nodes permission to take over ownership from the unavailable node;

2. Second Mechanism: The unavailable node may intentionally became unavailable because of service requirements (e.g., for maintenance), and therefore automatic takeover permission may be implied.

3. Third Mechanism: An optional and configurable background autonomic takeover protocol may determine that the unavailable node is actually unavailable and the unavailability has not simply been caused by a communication failure. The third mechanism provides a takeover mechanism similar to the ownership takeover via explicit user request (as described in the first mechanism).

For the above mechanisms, there may be three modes of takeover:

1. Read/Write (R/W)—This mode is enabled either by the first or third mechanism if configured to do so. In the R/W mode, once the storage object is taken over, the existing nodes can read/write to the object and the properties of the object.

2. Read Only (R/O)—The R/O mode is enabled either by the first or third mechanism if configured to do so. Once a storage object is taken over, the existing nodes can only read the storage object and the associated properties of the storage object. Any write attempt to the storage object will fail.

3. Read/Write Service—Th "R/W service" mode is similar to the R/W mode except for the fact that the "R/W service" mode is automatically enabled through the intentional service entrance of the second mechanism.

Once a method and a mode is enabled, existing nodes will view that their owner values and validity information points to the current owner which is the unavailable node. At this time, existing nodes have to arbitrate for a special token or empty storage object to serialize takeover from the unavailable node. For purposes of illustration, let us call the special token $ST_x$ where x is the index of the unavailable node. Once $ST_x$ is owned and locked down, the owner of the $ST_x$ lock can preemptively update its local ownership information and validity information to claim the storage objects of the unavailable node as the owner. The owner of the $ST_x$ lock then updates all peer nodes to agree. The $ST_x$ locks prevents two available nodes from taking over the ownership at the same time. The $ST_x$ lock can also be taken over if the $ST_x$ lock is currently owned by an unavailable cluster which allows for takeover.

For further illustration, the original owner node is referred to the "v-node" and the new owner node is referred to as the "r-node". The r-node now is the new owner. The ownership can then be transferred from the r-node to another available node if requested. Therefore, for purposes of illustration:

v-node—Old owner;

r-node—Node that took over the volume; and

New Owner—Node that currently owns the volume (the new owner is initially equal to r-node at time of takeover).

Before a r-node can takeover the volume, the r-node validates the view of the data object seen by the r-node. The r-node determines whether the r-node's meta-data is consistent or inconsistent. The r-node determines that the r-node's view of the data contents is consistent if the takeover operation requires consistent data (i.e. reading the data vs. write from the beginning). The consistent data may not reside within the r-node, but within one of the other available nodes. The r-node may have consistent meta-data pointing to the consistent data.

Once the volume is taken over, the r-node stores the following information about the volume at the time of the takeover:

1. What validity level existed at the time of the takeover.

2. What data consistency level existed at the time of the takeover.

3. What properties consistency level existed at the time of the takeover.

In addition to storing the above values, the r-node is responsible for informing all other peers about the takeover. This informing of the takeover may be referred to as "awareness". The awareness of the takeover is saved within the token and each node may then be aware of the v-node, the r-node and the type of takeover (i.e. R/W, R/O, R/W-Service).

When the v-node rejoins the configuration or becomes available, the r-node may make the v-node aware of the takeover through reconciliation. The reconciliation may be preformed in accordance with the following operations:

1. Invalidate the v-node so as to prevent the v-node from thinking that the v-node is the owner.

2. View the v-node's owner validity, data consistency level and properties level.

a. If the v-node wasn't really the owner, move to error state.

b. If the v-node also wrote to the data object and the r-node or others did as well, then move the data object into an error state.

c. If the v-node wrote to the data object and the r-node or others only read the information and the v-node has a higher owner validity level, then return ownership to the v-node.

d. If the v-node did not write to the data object and the r-node or others either read or wrote to the object, maintain the new owner and update the v-node's ownership validity information to agree.

3. Once the v-node is aware and all other nodes are aware, the r-node may clear all history of the takeover. If nodes are unavailable or not aware, the takeover awareness information must remain in the r-node until all nodes are educated or aware. Only then can the takeover awareness information be cleared.

The r-node which is the only node that can reconcile the takeover may be requested to be put into service (i.e., taken off-line) before the v-node becomes available. At this time, the r-node must surrender the r-node role to another available educated/aware node. The new r-node may then save the same information the original r-node saved while also incrementing a "r-node transfer" version. This increased version is used to validate the latest r-node cluster in the event transfers are made multiple times. The latest r-node is then responsible for educating all nodes of the new version information and awareness. The latest r-node will also reconcile the v-node and clear the takeover history.

Once the unavailable or v-node cluster becomes available, the takeover modes are all automatically disabled and normal ownership protocol ownership requests initiated. No further takeovers take place. If the new owner becomes unavailable and the r-node has not yet cleared the takeover across all nodes, then a second takeover is not allowed.

Exemplary Embodiments

FIG. 1 illustrates a block diagram of a computing environment 100 that includes a plurality of nodes 102, 104, 106 that are coupled via a network 108, in accordance with certain embodiments. While FIG. 1 shows three nodes, node A 102, node B 104, and node N 106, in alternative embodiments a different number of nodes may be coupled via the network 108.

The nodes 102, 104, 106 may comprise any suitable computational platform, including those presently known in the art, such as, a server, a personal computer, a workstation, a mainframe, a midrange computer, a network appliance, a palm top computer, a telephony device, a blade computer, a hand held computer, etc. Each of the nodes 102, 104, 106 may also represent a cluster, i.e., a collection of nodes.

A storage object 110, such as a logical storage volume, may be shared among some or all of the plurality of nodes 102, 104, 106. The storage object 110 may reside in a storage device coupled to the network or may reside in any of the nodes 102, 104, 106 or may reside in some other element of the computing environment 100. While the storage object 110 is shown to represent a logical storage volume, in alternative embodiments the storage object 110 may represent any other unit of storage, such as a logical block, a segment, etc. While only one storage object 110 has been shown, a plurality of storage objects may be distributed in the computing environment 100, wherein the plurality of storage objects may be shared by the plurality of nodes 102, 104, 106.

Associated with the storage object 110 are the data 112 included in the storage object 110 and storage object attributes 114 corresponding to the storage object 110. The storage object attributes 114 include a current owner node indicator 116, metadata 118 that includes ownership validity information 120, and a lock 122 for data update. The current owner node indicator 116 indicates which of the nodes included in the computing environment 100 is the current owner node of the storage object 110. The ownership validity information 118 may be used to resolve the validity of ownership of the storage object 110 among the plurality of nodes 102, 104, 106 of the computing environment 100. The lock 122 is a data structure that is required to be possessed by a node before the node can exclusively access the storage object 110. The nodes 102, 104, 106 may maintain local versions 124, 126, 128 of the attributes 114 of the storage object 110.

Therefore, FIG. 1 illustrates certain embodiments in which local versions 122, 126, 128 of attributes 114 of a storage object 110 are stored at a plurality of nodes 102, 104, 106, wherein a first attribute, referred to as a current owner node 116, designates a node of the plurality of nodes as an owner node for the storage object 110, and wherein a second attribute, referred to as metadata 118, includes information 120 to resolve the validity of ownership of the storage object 110 among the plurality of nodes. In further embodiments, each node of the plurality of nodes 102, 104, 106 comprises a cluster of a plurality of clusters 102, 104, 106, wherein the plurality of clusters 102, 104, 106 comprise a domain, and wherein the storage object 110 is a shared object for the plurality of clusters 102, 104, 106 of the domain, and wherein a stored object that is shared is a logical object that is physically stored on a device included in the domain.

Figure 2:
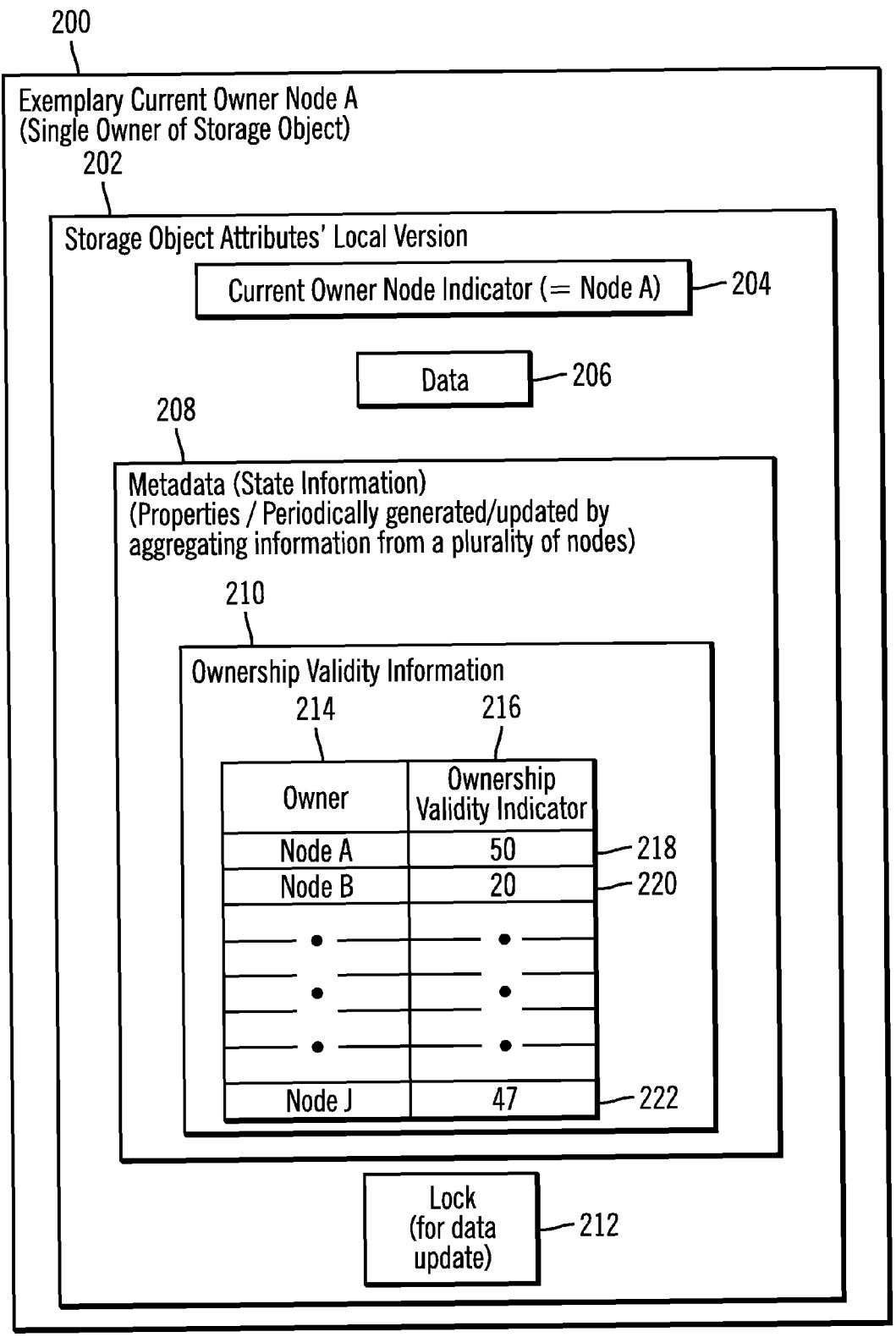
FIG. 2 illustrates a block diagram that shows data structures included in an exemplary current owner node, in accordance with certain embodiments.

FIG. 2 illustrates a block diagram that shows data structures included in an exemplary current owner node 200, in accordance with certain embodiments. While FIG. 2 shows that the current owner node is "Node A" (corresponding to node 102 of FIG. 1), in alternative embodiments the exemplary current owner node 200 may correspond to any of the nodes 102, 104, 106 of the computing environment 100 shown in FIG. 1. At any given time, the exemplary current owner node 200 may be the single owner of the storage object 110 shown in FIG. 1.

The storage object attributes' local version 200 (corresponds to storage object attributes' local version 124 of FIG. 1) associated with the exemplary current owner node 200 may include the current owner node indicator 204, the data 206 corresponding to the storage object currently owned by the exemplary current owner node 200, the metadata 208 including ownership validity information 210, and the lock 212.

The metadata 208 may be periodically generated and/or updated by aggregating information from the plurality of nodes 102, 104, 106 of the computing environment 100. The ownership validity information 210 may include for each of the potential owners 214 of the storage object 110 an ownership validity indicator 216. For example in the illustrative table representing the ownership validity information 210, row 218 shows that "Node A" has an ownership validity indicator with value 50, row 220 shows that "Node B" has an ownership validity indicator with value 20, and row 222 shows that "Node J" has an ownership validity indicator with value 47. In this particular exemplary embodiment, the current node indicator 204 shows that the current owner is "Node A" which also has the highest value for the ownership validity indicator 216. In certain embodiments, the ownership validity indicator 216 for a node may be used to determine whether to allow another node to inherit ownership of the storage object 110 once the owner node surrenders ownership of the storage object 110.

Figure 3:
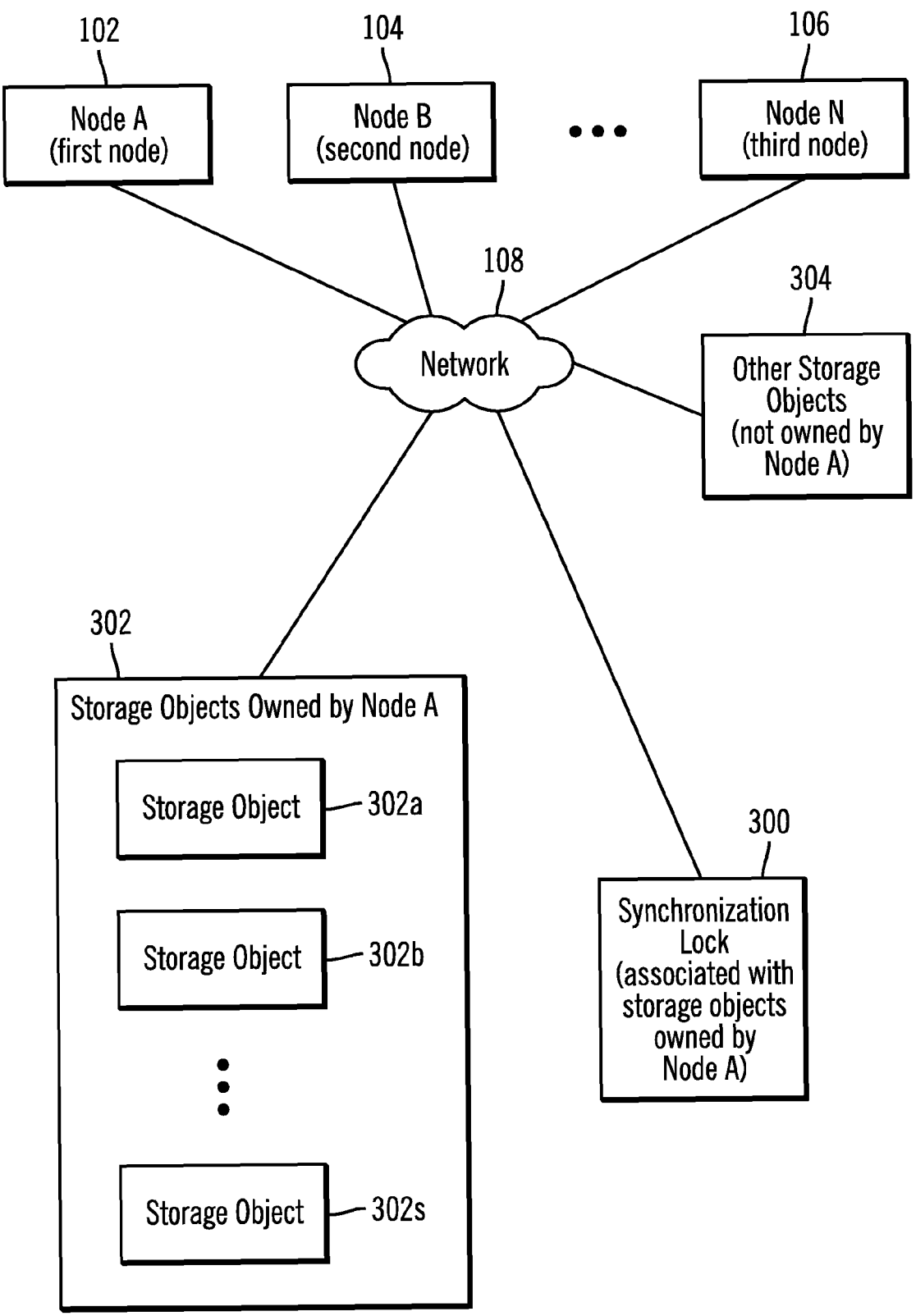
FIG. 3 illustrates a block diagram that shows how a synchronization lock is used, in accordance with certain embodiments.

FIG. 3 illustrates a block diagram that shows how a synchronization lock 300 is used in the computing environment 100, in accordance with certain embodiments. FIG. 3 shows storage objects 302, including exemplary storage objects 302a, 302b, . . . , 302s, owned by node A 102, and other storage objects 304 that are not owned by node A 102. The synchronization lock 300 is associated with the storage objects 302 owned by node A 102.

In certain embodiments, the synchronization lock 300 has to be owned by another node, such as node B 104, before a preemptive transfer of ownership of one of more of the storage objects 302 can take place from node A 102 to node B 104, in the event that node A becomes unavailable. For example, if node A 102 became unavailable and node B wanted to preemptively take over ownership of some or all of the storage objects 302, then node B must take over ownership of the synchronization lock 300 before preemptively taking over ownership of some or all of the storage objects 302. As a result of the requirement to possess the synchronization lock 302 before takeover of ownership, race conditions that may occur when multiple nodes attempt to take over ownership of some or all of the storage objects are avoided in certain embodiments.

Figure 4:
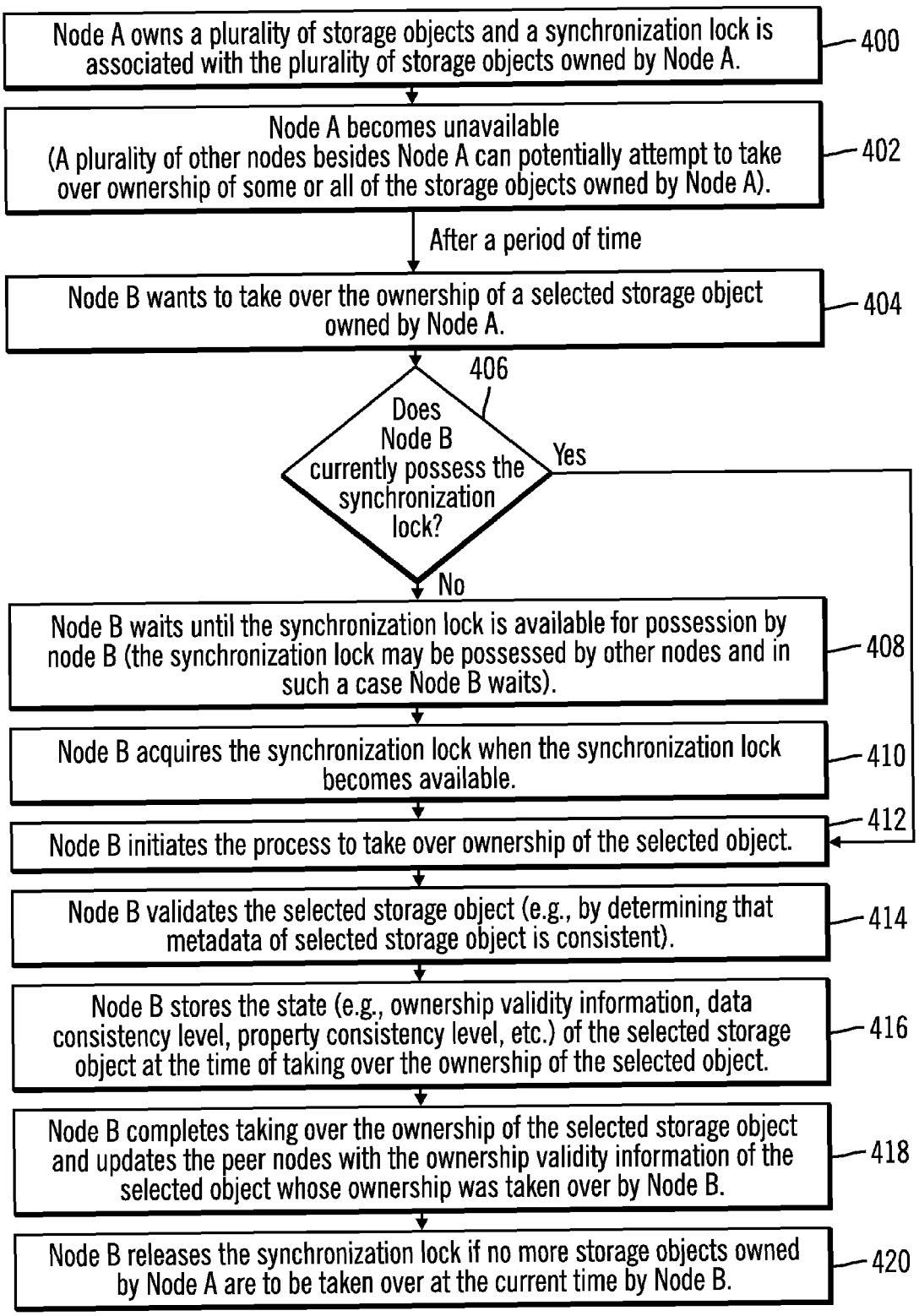
FIG. 4 illustrates first operations implemented in the computing environment, in accordance with certain embodiments.

FIG. 4 illustrates first operations implemented in the computing environment 100, in accordance with certain embodiments. The first operations may be performed by hardware, software, or firmware present on one or more of the nodes 102,104,106.

Control starts at block 400, where node A 102 owns a plurality of storage objects 302 and a synchronization lock 300 is associated with the plurality of storage objects 302 owned by node A 102. Control proceeds to block 402, where node A 102 becomes unavailable. A plurality of other nodes besides node A (which has become unavailable) can then potentially attempt to take over ownership of some or all of the storage objects 302 owned by node A 102.

After a period of time, node B 104 wants (at block 404) to take over the ownership of a selected storage object 302a owned by node A 102. Node B 104 may in certain alternative embodiments want to take over more storage objects or all storage objects owned by node A 102.

Control proceeds to block 406, where a determination is made as to whether node B 104 currently possesses the synchronization lock 300. If not, then node B 104 waits (at block 408) until the synchronization lock 300 is available for possession by node B 104. For example, the synchronization lock 300 may be possessed by other nodes and in such a case node B 104 waits for the synchronization lock 300.

Node B 104 acquires (at block 410) the synchronization lock 300 when the synchronization lock 300 becomes available, and node B 104 then initiates (at block 412) the process to take over ownership of the selected object 302a. Node B 104 then validates (at block 414) the selected storage object 302a (e.g., by determining that metadata of selected storage object is consistent).

Node B 104 stores (at block 416) the state (e.g., ownership validity information, data consistency level, property consistency level, etc.) of the selected storage object at the time of taking over the ownership of the selected object 102a. Node B 104 then completes (at block 418) the taking over the ownership of the selected storage object 302a and updates the peer nodes (e.g., Node N 106) with the ownership validity information of the selected object 302a whose ownership was taken over by Node B 104. Node B 104 then releases (at block 420) the synchronization lock 300 if no more storage objects owned by Node A 102 are to be taken over at the current time by Node B 104.

If at block 406 a determination is made that node B 104 currently possesses the synchronization lock 300 then control proceeds to block 412 where node B 104 initiates the process to take over the selected object 302a.

In certain embodiments, node B 104 stores state information corresponding to the selected storage object 302a owned by node A 102. Node B 104 communicates ownership validity information of the selected storage object 302a to other nodes of the plurality of nodes. Node B 104 then releases the serialization lock 300 and other nodes are allowed to acquire ownership of the storage objects 302. In additional embodiments, the state information stored by node B 104 comprises: (i) ownership validity information indicating which node was a valid owner of the selected storage object 302a at a time of taking over ownership of the selected storage object by node B 104; (ii) data version stored in the selected storage object 302a at the time of taking over ownership of the selected storage object 302a by node B; (iii) metadata about the data stored in the selected storage object 302a at the time of taking over ownership of the selected storage object by the second node.

Figure 5:
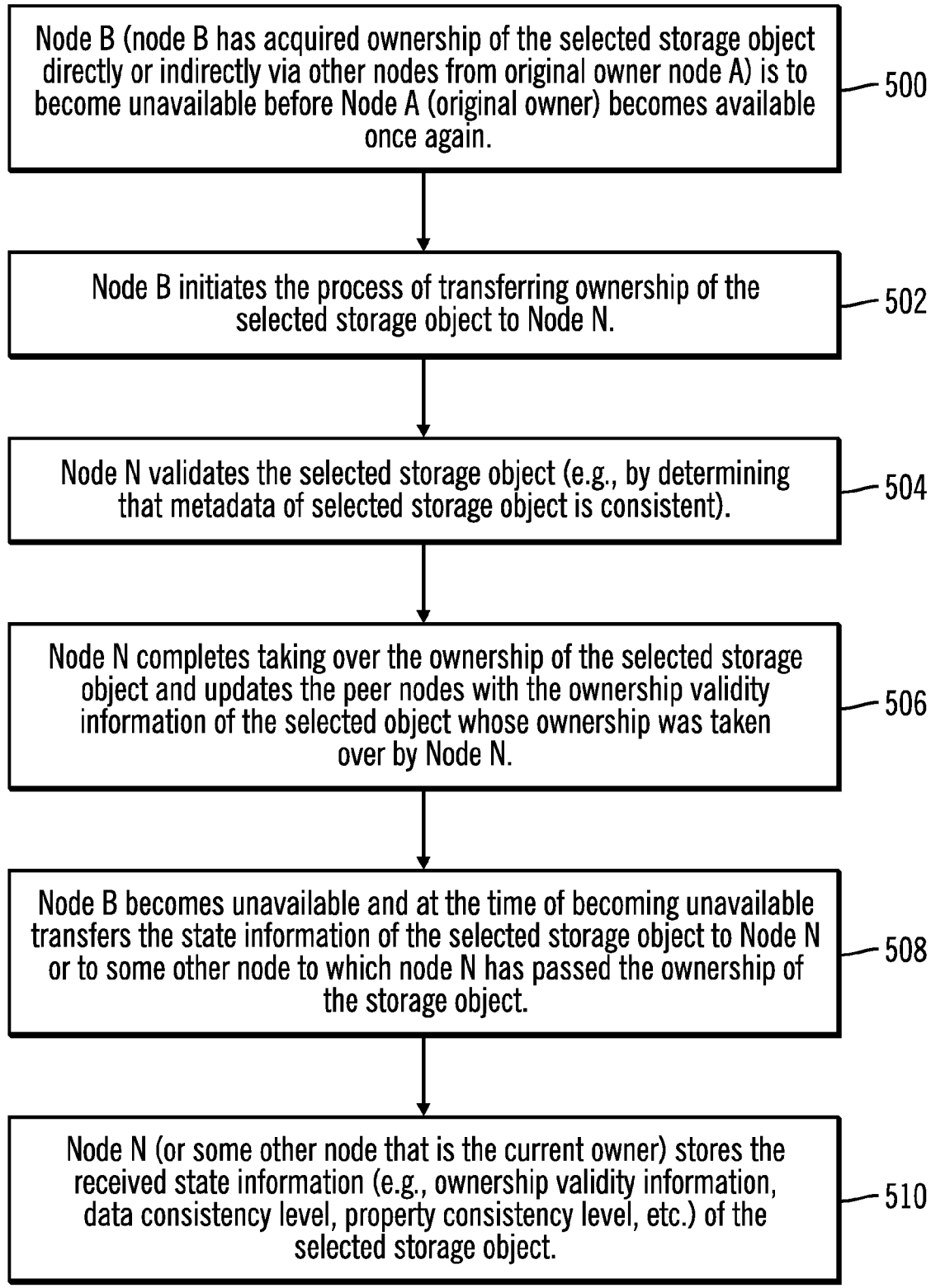
FIG. 5 illustrates second operations implemented in the computing environment, in accordance with certain embodiments.

FIG. 5 illustrates second operations implemented in the computing environment 100, in accordance with certain embodiments. The second operations may be performed by hardware, software, or firmware present on one or more of the nodes 102, 104,106. FIG. 5 shows the operations performed when a node that owns state information for a storage object whose ownership has been transferred to another node is to become unavailable. It is possible for a selected node to keep holding the state information for a storage object while the storage object is being transferred from node to node, as long as the selected node is available. However, if the selected node is to become unavailable then the state information of the storage object should be transferred to the current owner node, such that if the original owner node (e.g., node A 102) became available once again, the current owner node could provide the state information to the original owner node.

Control starts at block 500, where node B 104 that has acquired ownership of the selected storage object 302a directly or indirectly via other nodes or from original owner node A 102, is to become unavailable before node A 102 (original owner) becomes available once again.

Node B 104 initiates (at block 502) the process of transferring ownership of the selected storage object 302a to node N 106. Control proceeds to block 504, where node N 106 validates the selected storage object 302a (e.g., by determining that metadata of selected storage object 302a is consistent). Then, node N 106 completes (at block 506) taking over the ownership of the selected storage object 302a and updates the peer nodes with the ownership validity information of the selected object 302a whose ownership was taken over by Node N 106. Node N 106 now possess ownership of the selected object 302a without necessarily possessing the state information of the selected object 302a, wherein the state information of the selected object 302a is still with node B 104.

Once node N 106 has taken over the ownership of the selected storage object 302a and has then optionally passed on the ownership to other nodes, node B 104 becomes (at block 508) unavailable. At the time of becoming unavailable, node B 104 transfers the state information of the selected storage object 302a to node N 106 or in alternative embodiments to some other node to which ownership of the selected storage object 302a has passed. Node N 106 (or the current owner node) stores (at block 510) the received state information (e.g., ownership validity information, data consistency level, property consistency level, etc.) of the selected storage object 302a and may at a subsequent point in time provide the state information to the original owner node A 102 when the original owner node A becomes available.

Therefore, FIG. 5 illustrates how one or more selected storage objects and corresponding state information are transferred from one node to another when one node is to become unavailable before the original owner node of the one or more selected storage objects become available. In FIG. 5, the notion of node B 104 giving ownership to node N 106 while original owner node A 102 is still down is independent of the state information. The ownership can be transferred between node B 104 through to other nodes once the preemptive takeover, has occurred. However, node B 104 still owns the state information. That state information can be transferred to node N 106 when node B is going to become unavailable. This allows node N 106 to update node A's 102 ownership information once node A 102 comes back, i.e., becomes available.

Figure 6:
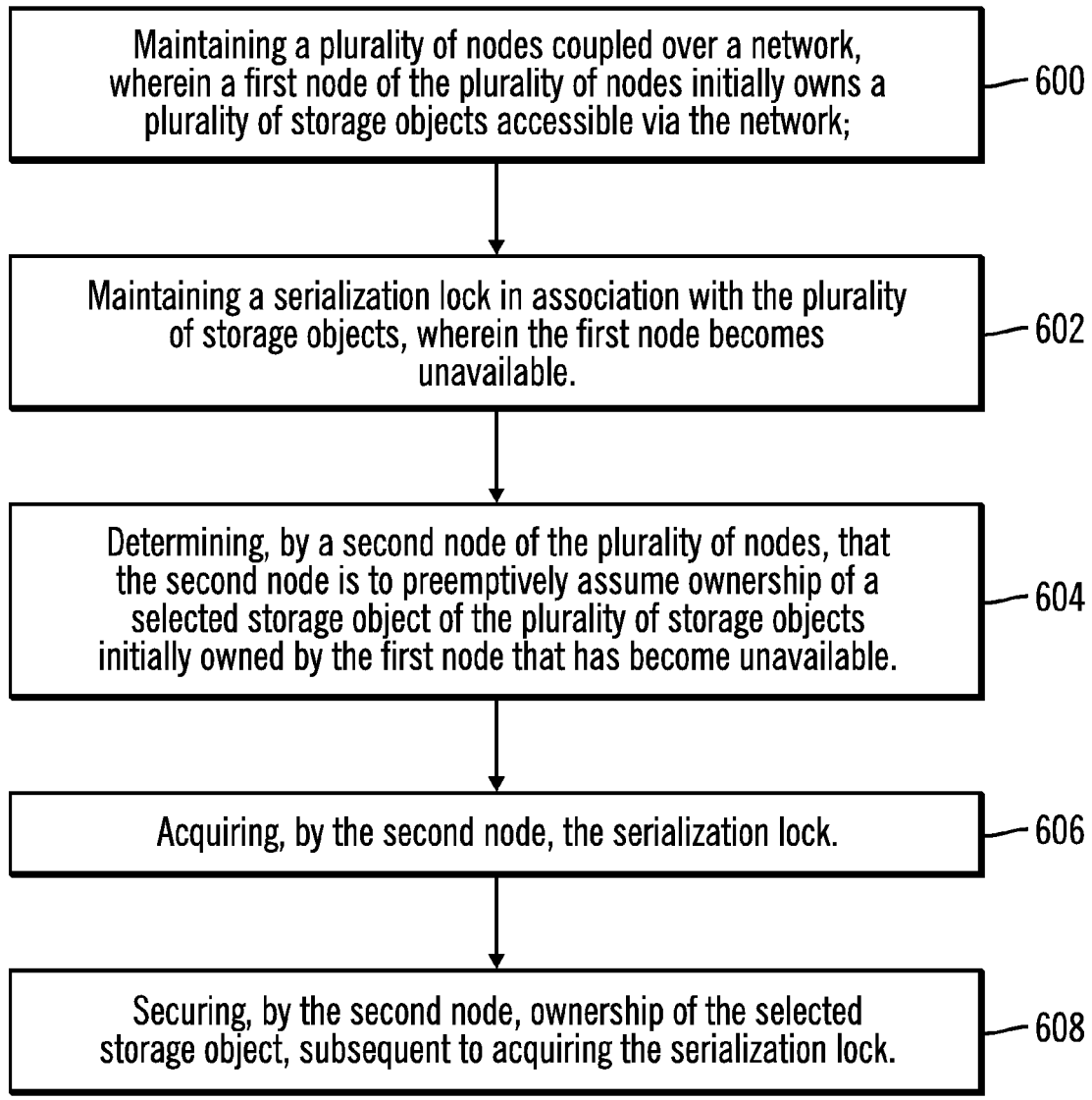
FIG. 6 illustrates third operations implemented in the computing environment, in accordance with certain embodiments.

FIG. 6 illustrates third operations implemented in the computing environment 100, in accordance with certain embodiments. The third operations may be performed by hardware, software, or firmware present on one or more of the nodes 102,104,106.

Control starts at block 600, wherein a plurality of nodes 102, 104, 106 coupled over a network 108 are maintained, wherein a first node 102 (e.g., node A 102) of the plurality of nodes 102, 104, 106 initially owns a plurality of storage objects 302 accessible via the network. A serialization lock is maintained (at block 602) in association with the plurality of storage objects 108, wherein the first node 102 becomes unavailable.

Control proceeds to block 604, where a second node 104 (e.g., node B 104) of the plurality of nodes 102, 104, 106 determines that the second node 104 is to preemptively assume ownership of a selected storage object 302a of the plurality of storage objects 302a . . . 302s initially owned by the first node 102 that has become unavailable. The second node 104 acquires (at block 606) the serialization lock 300.

The second node then secures (at block 608) ownership of the selected storage object 302a, subsequent to acquiring the serialization lock 300.

Therefore, FIG. 6 illustrates certain embodiments for securing a serialization lock 300 while acquiring ownership of storage objects 302 from a node 102 that is no longer available. In certain embodiments, at a subsequent point in time, an updating is performed of the preemptive ownership transfer of the selected storage object on the first node 102, either from the second node 104 or from some other node that has acquired state information of the selected storage object directly or indirectly from the second node 104, in response to the first node 102 becoming available.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable storage medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 7:
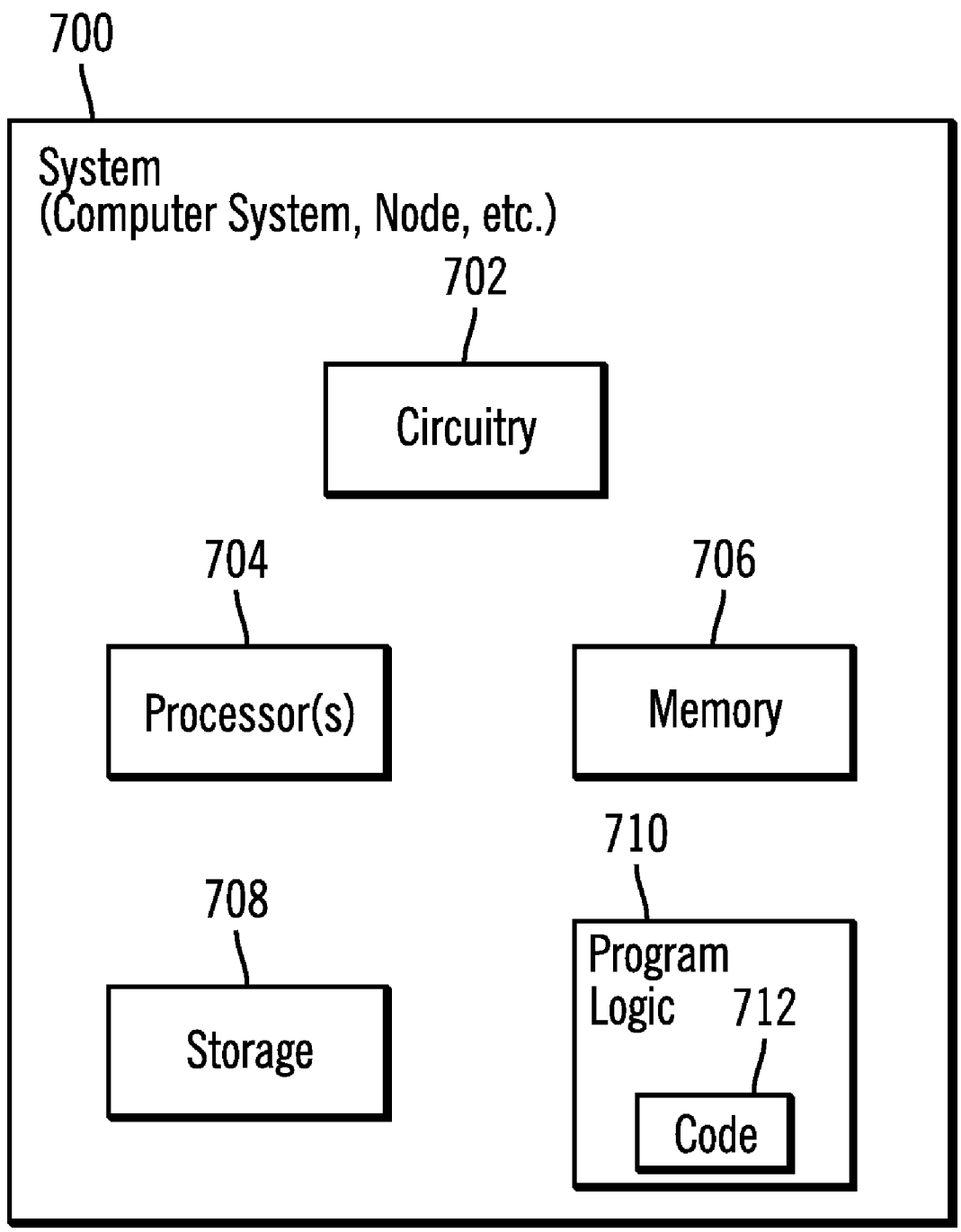
FIG. 7 illustrates a block diagram that shows certain elements that may be included in a node of the computing environment, in accordance with certain embodiments.

FIG. 7 illustrates a block diagram that shows certain elements that may be included nodes 102, 104, 106, in accordance with certain embodiments. One or more of the nodes 102, 104, 106 either individually or collectively may also be referred to as a system, and may include a circuitry 702 that may in certain embodiments include a processor 704. The system 700 may also include a memory 706 (e.g., a volatile memory device), and storage 708. The storage 708 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 708 may comprise an internal storage device, an attached storage device and/or a network accessible storage device. The system 700 may include a program logic 710 including code 712 that may be loaded into the memory 706 and executed by the processor 704 or circuitry 702. In certain embodiments, the program logic 710 including code 712 may be stored in the storage 708. In certain other embodiments, the program logic 710 may be implemented in the circuitry 702. Therefore, while FIG. 7 shows the program logic 710 separately from the other elements, the program logic 710 may be implemented in the memory 706 and/or the circuitry 702.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 1-7 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-7 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method performed by at least one processor coupled to a memory, the method comprising:
    maintaining, by the at least one processor, a plurality of nodes coupled over a network, wherein a first node of the plurality of nodes initially owns a plurality of storage objects accessible via the network;
    maintaining a serialization lock in association with the plurality of storage objects, wherein the first node becomes unavailable;
    determining, by a second node of the plurality of nodes, that the second node is to preemptively assume ownership of a selected storage object of the plurality of storage objects initially owned by the first node that has become unavailable;
    acquiring, by the second node, the serialization lock;
    securing, by the second node, ownership of the selected storage object, subsequent to acquiring the serialization lock; and
    in response to the first node becoming available subsequent to the ownership of the selected storage object being secured by the second node, performing during reconciliation by the second node:
        returning ownership of the selected storage object to the first node, in response to the first node having written to the selected storage object, and the second node having read but not written to the selected storage object;

maintaining ownership of the selected storage object with the second node, in response to the first node not having written to the selected storage object and the second node having written to the selected object; and moving the selected storage object into an error state, in response to both the first node and the second node having written to the selected storage object.

2. The method of claim 1, the method further comprising:

storing, by the second node, state information corresponding to the selected storage object;

communicating, by the second node, ownership validity information of the selected storage object to other nodes of the plurality of nodes;

releasing, by the second node, the serialization lock; and allowing other nodes to acquire ownership of the selected storage object.

3. The method of claim 2, wherein the state information comprises:

(i) ownership validity information indicating which node was a valid owner of the selected storage object at a time of taking over ownership of the selected storage object by the second node;

(ii) data version stored in the selected storage object at the time of taking over ownership of the selected storage object by the second node;

(iii) metadata about the data stored in the selected storage object at the time of taking over ownership of the selected storage object by the second node.

4. The method of claim 1, further comprising:

determining that the second node is to become unavailable, wherein the first node is still unavailable;

transferring, by the second node, state information of the selected storage object, to a third node of the plurality of nodes, wherein the third node assumes responsibility for maintaining the state information corresponding to the selected storage object prevailing at a time the selected node was preemptively transferred from the first node that initially owned the selected storage object, and wherein the third node communicates ownership validity information of the selected storage object to other nodes of the plurality of nodes.

5. The method of claim 1, wherein:

a local version of attributes of the selected storage object stores ownership validity information;

the ownership validity information has a first ownership validity indicator for the first node;

the ownership validity information has a second ownership validity indicator for the second node; and the first ownership validity indicator has a greater numeric value than the second ownership validity indicator.

6. A system, comprising:

a memory; and a processor coupled to the memory, wherein the processor executes operations, the operations comprising:

(i) maintaining a plurality of nodes coupled over a network, wherein a first node of the plurality of nodes initially owns a plurality of storage objects accessible via the network;

(ii) maintaining a serialization lock in association with the plurality of storage objects, wherein the first node becomes unavailable;

(iii) determining, by a second node of the plurality of nodes, that the second node is to preemptively assume ownership of a selected storage object of the plurality of storage objects initially owned by the first node that has become unavailable;

(iv) acquiring, by the second node, the serialization lock;

(v) securing, by the second node, ownership of the selected storage object, subsequent to acquiring the serialization lock; and (vi) in response to the first node becoming available subsequent to the ownership of the selected storage object being secured by the second node, performing during reconciliation:

returning, by the second node, ownership of the selected storage object to the first node, in response to the first node having written to the selected storage object, and the second node having read but not written to the selected storage object;

maintaining ownership of the selected storage object with the second node, in response to the first node not having written to the selected storage object and the second node having written to the selected object; and moving, by the second node, the selected storage object into an error state, in response to both the first node and the second node having written to the selected storage object.

7. The system of claim 6, the operations further comprising:

storing, by the second node, state information corresponding to the selected storage object;

communicating, by the second node, ownership validity information of the selected storage object to other nodes of the plurality of nodes;

releasing, by the second node, the serialization lock; and allowing other nodes to acquire ownership of the selected storage object.

8. The system of claim 7, wherein the state information comprises:

(i) ownership validity information indicating which node was a valid owner of the selected storage object at a time of taking over ownership of the selected storage object by the second node;

(ii) data version stored in the selected storage object at the time of taking over ownership of the selected storage object by the second node;

(iii) metadata about the data stored in the selected storage object at the time of taking over ownership of the selected storage object by the second node.

9. The system of claim 6, the operations further comprising:

determining that the second node is to become unavailable, wherein the first node is still unavailable;

transferring, by the second node, state information of the selected storage object, to a third node of the plurality of nodes, wherein the third node assumes responsibility for maintaining the state information corresponding to the selected storage object prevailing at a time the selected node was preemptively transferred from the first node that initially owned the selected storage object, and wherein the third node communicates ownership validity information of the selected storage object to other nodes of the plurality of nodes.

10. The system of claim 6, wherein:

a local version of attributes of the selected storage object stores ownership validity information;

the ownership validity information has a first ownership validity indicator for the first node;

the ownership validity information has a second ownership validity indicator for the second node; and the first ownership validity indicator has a greater numeric value than the second ownership validity indicator.

11. A computer readable storage medium storing code, wherein the code when executed by a computer causes operations, the operations comprising:
maintaining a plurality of nodes coupled over a network, wherein a first node of the plurality of nodes initially owns a plurality of storage objects accessible via the network;
maintaining a serialization lock in association with the plurality of storage objects, wherein the first node becomes unavailable;
determining, by a second node of the plurality of nodes, that the second node is to preemptively assume ownership of a selected storage object of the plurality of storage objects initially owned by the first node that has become unavailable;
acquiring, by the second node, the serialization lock;
securing, by the second node, ownership of the selected storage object, subsequent to acquiring the serialization lock; and
in response to the first node becoming available subsequent to the ownership of the selected storage object being secured by the second node, performing by the second node during reconciliation:
returning ownership of the selected storage object to the first node, in response to the first node having written to the selected storage object, and the second node having read but not written to the selected storage object;
maintaining ownership of the selected storage object with the second node, in response to the first node not having written to the selected storage object and the second node having written to the selected object; and
moving the selected storage object into an error state, in response to both the first node and the second node having written to the selected storage object.

12. The computer readable storage medium of claim 11, the operations further comprising:
storing, by the second node, state information corresponding to the selected storage object;
communicating, by the second node, ownership validity information of the selected storage object to other nodes of the plurality of nodes;
releasing, by the second node, the serialization lock; and
allowing other nodes to acquire ownership of the selected storage object.

13. The computer readable storage medium of claim 12, wherein the state information comprises:
(i) ownership validity information indicating which node was a valid owner of the selected storage object at a time of taking over ownership of the selected storage object by the second node;
(ii) data version stored in the selected storage object at the time of taking over ownership of the selected storage object by the second node;
(iii) metadata about the data stored in the selected storage object at the time of taking over ownership of the selected storage object by the second node.

14. The computer readable storage medium of claim 11, the operations further comprising:
determining that the second node is to become unavailable, wherein the first node is still unavailable;
transferring, by the second node, state information of the selected storage object, to a third node of the plurality of nodes, wherein the third node assumes responsibility for maintaining the state information corresponding to the selected storage object prevailing at a time the selected node was preemptively transferred from the first node that initially owned the selected storage object, and wherein the third node communicates ownership validity information of the selected storage object to other nodes of the plurality of nodes.

15. The computer readable storage medium of claim 11, wherein:
a local version of attributes of the selected storage object stores ownership validity information;
the ownership validity information has a first ownership validity indicator for the first node;
the ownership validity information has a second ownership validity indicator for the second node; and
the first ownership validity indicator has a greater numeric value than the second ownership validity indicator.

16. A method for deploying computing infrastructure, comprising integrating computer-readable code into a computing system, wherein the code in combination with the computing system performs:
maintaining a plurality of nodes coupled over a network, wherein a first node of the plurality of nodes initially owns a plurality of storage objects accessible via the network;
maintaining a serialization lock in association with the plurality of storage objects, wherein the first node becomes unavailable;
determining, by a second node of the plurality of nodes, that the second node is to preemptively assume ownership of a selected storage object of the plurality of storage objects initially owned by the first node that has become unavailable;
acquiring, by the second node, the serialization lock;
securing, by the second node, ownership of the selected storage object, subsequent to acquiring the serialization lock; and
in response to the first node becoming available subsequent to the ownership of the selected storage object being secured by the second node, performing by the second node during reconciliation:
returning ownership of the selected storage object to the first node, in response to the first node having written to the selected storage object, and the second node having read but not written to the selected storage object;
maintaining ownership of the selected storage object with the second node, in response to the first node not having written to the selected storage object and the second node having written to the selected object; and
moving the selected storage object into an error state, in response to both the first node and the second node having written to the selected storage object.

17. The method for deploying computing infrastructure of claim 16, wherein the code in combination with the computing system is further performs:
storing, by the second node, state information corresponding to the selected storage object;
communicating, by the second node, ownership validity information of the selected storage object to other nodes of the plurality of nodes;
releasing, by the second node, the serialization lock; and
allowing other nodes to acquire ownership of the selected storage object.

18. The method for deploying computing infrastructure of claim 17, wherein the state information comprises:

(i) ownership validity information indicating which node was a valid owner of the selected storage object at a time of taking over ownership of the selected storage object by the second node;

(ii) data version stored in the selected storage object at the time of taking over ownership of the selected storage object by the second node;

(iii) metadata about the data stored in the selected storage object at the time of taking over ownership of the selected storage object by the second node.

19. The method for deploying computing infrastructure of claim 16, wherein the code in combination with the computing system is further performs:

determining that the second node is to become unavailable, wherein the first node is still unavailable;

transferring, by the second node, state information of the selected storage object, to a third node of the plurality of nodes, wherein the third node assumes responsibility for maintaining the state information corresponding to the selected storage object prevailing at a time the selected node was preemptively transferred from the first node that initially owned the selected storage object, and wherein the third node communicates ownership validity information of the selected storage object to other nodes of the plurality of nodes.

20. The method for deploying computing infrastructure of claim 16, wherein:

a local version of attributes of the selected storage object stores ownership validity information;

the ownership validity information has a first ownership validity indicator for the first node;

the ownership validity information has a second ownership validity indicator for the second node; and the first ownership validity indicator has a greater numeric value than the second ownership validity indicator.

* * * * *